June 12, 1951  L. W. STANFIELD  2,556,229
PILOT GUIDE
Filed Feb. 17, 1949
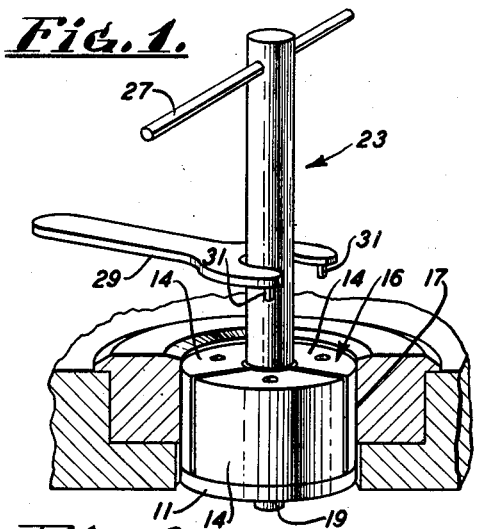
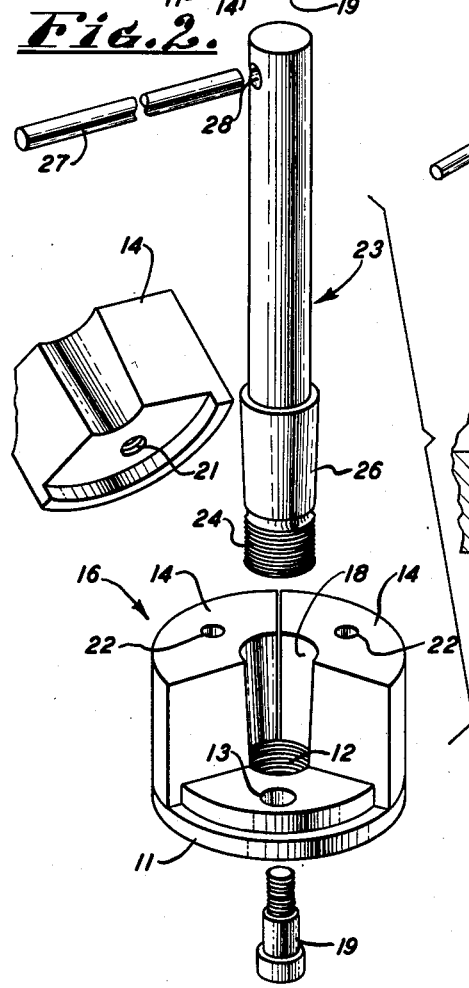
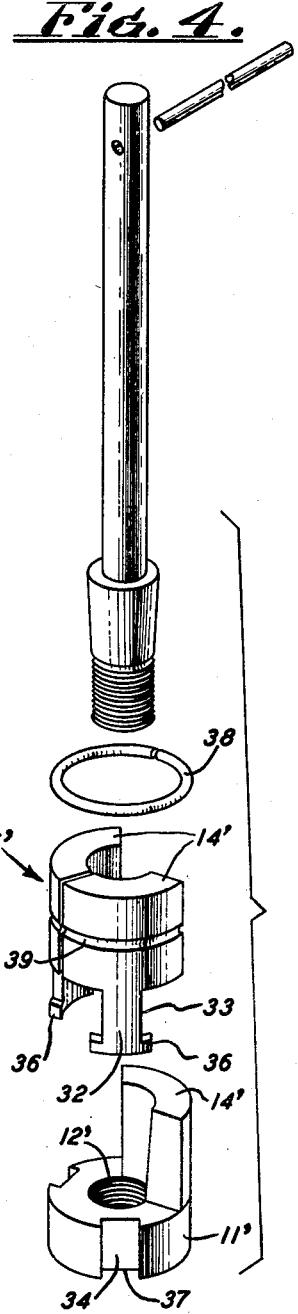
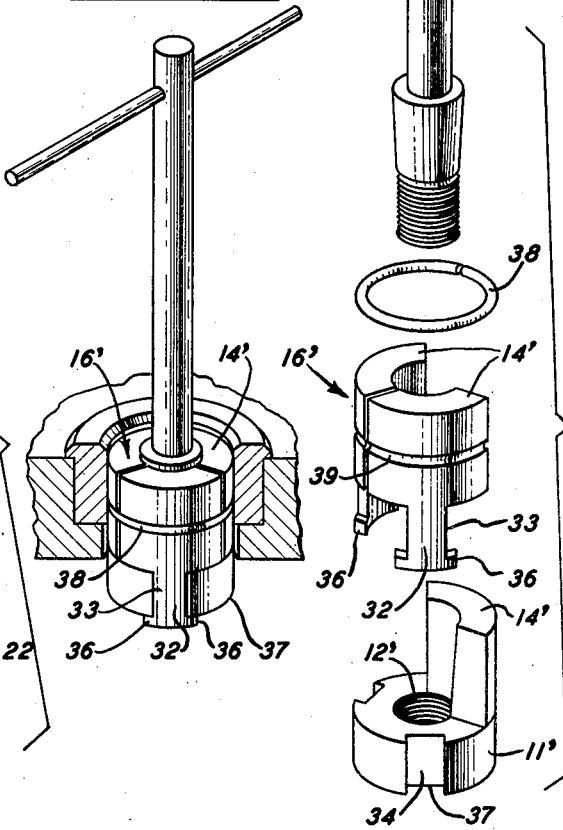
INVENTOR.
LYSLE W. STANFIELD
BY
M. O. Hayes
ATTORNEY Patented June 12, 1951

2,556,229

UNITED STATES PATENT OFFICE 2,556,229

PILOT GUIDE

Lysle W. Stanfield, Long Beach, Calif.

Application February 17, 1949, Serial No. 76,961

3 Claims. (Cl. 51—241)

(Granted under the act of March 3, 1883, as amended April 30, 1928; 370 O. G. 757)

This invention relates to apparatus for centering a valve seat grinder with respect to a valve port and more particularly to apparatus for centering a valve seat grinder in a blind valve port, i. e. accessible only from one side.

Heretofore, when a blind valve port required reseating, a cast iron plug and grinding compound were used and the lapping was done by hand. No means for guiding was provided and no simple method of checking the work while in progress was available. Furthermore, hand lapping is a long, tedious operation dependent almost entirely upon the skill of the operator. Consequently, because the lapping plugs are expendable and because of the time consumed by hand lapping, reseating of valves was a costly operation.

It is an object of this invention to provide apparatus for overcoming the above disadvantages.

It is another object of this invention to provide apparatus for centering a power driven valve grinder in a valve port.

Another object of this invention is to provide apparatus which makes it possible and simple to check accuracy during the valve seat grinding operation.

Another object of this invention is to provide apparatus which will always be central upon insertion into a valve port.

Another object of this invention is to provide centering apparatus which can be inserted easily and quickly in blind valve ports.

A further object of this invention is to provide centering apparatus which is inexpensive to make and does not require skilled personnel to use.

Other objects and many of the attendant advantages of this invention will be readily appreciated as the same becomes better understood by reference to the following description.

The apparatus of the instant invention comprises generally a cylindrical base provided with an axial threaded bore and a plurality of passageways consisting of holes or grooves which are directed axially and spaced radially and equiangularly from the threaded bore. A plurality of sectors engage the base, forming substantially a cylinder expandable into engagement with the wall of a valve port. The sector cylinder is provided with an axial tapered bore in alignment with the threaded bore in the base, the taper narrowing toward the base. Depending from the sectors and passing thru the holes or grooves in the base are a plurality of securing members in the form of screws threaded into the sectors, or T members integral with the sectors. The members serve to interlock the sectors with the base while permitting limited radial movemen with respect to the base. A cylindrical pilot is threaded into the base bore and is tapered to interact with the tapered bore of the sectors to expand the sectored cylinder against the wall of the valve port as the pilot is threaded further into the base bore. A handle extending diametrically thru a hole in the pilot serves to aid in the tightening, and a bifurcated wrench may be used to prevent the turning of the sectors and the base in the valve port upon turning of the pilot.

In use, the apparatus, with the pilot only partially engaged into the base, is inserted into a valve port. The pilot is then further screwed into the base; this expands the sectors into engagement with the wall of the valve port. After tightening the apparatus, the handle is removed and a power driven valve seat grinder is slipped over the pilot now centrally located in the valve port and the grinding operation is begun. To remove, after use, it is merely necessary to back off the pilot from the sectors by unscrewing it from the base, thereby loosening the sectors from the port wall, and withdraw the apparatus from the valve port.

Two embodiments of the instant invention have been illustrated in the accompanying drawings, wherein:

Fig. 1 is a perspective view of a first embodiment of the instant invention in position in a valve port;

Fig. 2 is an exploded perspective view showing a sector in detail;

Fig. 3 is a perspective view of another embodiment of the instant invention in position in a valve port; and Fig. 4 is an exploded perspective view of the Fig. 3 embodiment.

Referring to Figs. 1 and 2 of the drawings, 11 designates a cylindrical base provided with an axial threaded bore 12 and three passageways on holes 13 which are directed axially therethru and spaced radially and equiangularly from the threaded bore 12. Three sectors 14 engage the base 11 forming substantially a cylinder 16 adapted to expand into engagement with the wall of a valve port 17. The sectored cylinder 16 is provided with an axial tapered bore 18 in alignment with the threaded bore 12 in the base 11, the taper narrowing toward the base 11. Three screws 19 pass upwardly thru the holes 13 in the base 11 and engage threaded portions 21 of holes 22 in the sectors 14. The screws 19 serve to interlock the sectors 14 with the base 11 while at the same time permitting limited radial movement of the sectors 14 with respect to the base 11. This is achieved by making the holes 13 of somewhat greater diameter than the screws 19. A cylindrical pilot 23 is threaded at its bottom end 24 to engage the base bore 12 and is tapered as at 26 to interact with the tapered bore 18 of the cylinder 16 expanding it into contact with the wall of the valve port 17, as the pilot 23 is screwed further into the base bore 12. A handle 27 extending diametrically thru a hole 28 in the other end of the pilot 23 serves to aid in tightening the sectors 14 against the wall of the valve port 17. A bifurcated wrench 29, having a pair of studs 31 which fit into the holes 22 at the top of the sectors 14 may be used to prevent the turning of the sectors 14 and the base 11 in the valve port 17 upon screwing of the pilot 23 into the base 11. However, frictional engagement of the sectors and the wall may prove sufficient to prevent turning, in which case the wrench 29 is not needed.

Operation

In operation, the apparatus, with the pilot cylinder 23 only partially engaged into the threaded bore 12 of the base 11, is inserted into a valve port 17. The pilot 23, by means of the handle 27, is then further threaded into the base 11, thereby expanding the sectors 14 into engagement with the wall of the valve port 17. After the apparatus is securely tightened in the valve port 17, the handle 27 is removed from the hole 28, a power driven valve seat grinder (not shown) is slipped over the pilot 23, now centrally located in the valve port, and the grinding operation is performed. To remove from the valve port after use, the sectors 14 are backed off from the wall of the port by unscrewing the pilot 23 from the base 11, then withdrawing the apparatus.

Modification

The modified form of the instant invention illustrated in Figs. 3 and 4 of the drawings eliminates the screws 19, interlocking the sectors 14 and the base 11 (Figs. 1 and 2). The screws are replaced by a plurality of securing members or T's 32, depending from the sectors 14' and integral therewith. The legs 33 of the T's 32 pass thru passageways or grooves 34 on the circumference of the base 11', directed axially and spaced radially and equiangularly from the threaded bore 12' and the arms 36 of the T's 32 extend adjacent the bottom face 37 of the base 11', thereby interlocking the sectors 14' with the base 11' while permitting radial movement with respect to the base. A split ring 38, seated in a circumferential recess 39 in the sector cylinder 16', serves to resiliently limit the radial movement of the sectors 14' with respect to the base and to hold the sector cylinder 16' together. The operation of this modification is identical with that of the Figs. 1 and 2 embodiment.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Apparatus for centering a valve seat grinder with respect to a valve port comprising: a cylindrical base provided with an axial, threaded bore, said base having a plurality of holes therethru directed axially and spaced radially and equiangularly from said threaded bore, a plurality of sectors engaging said base, said sectors forming substantially a cylinder, adapted to expand into engagement with the walls of a valve port, said cylinder being provided with an axial bore in alignment with said threaded bore in said base, said cylinder bore being tapered, with the taper narrowing toward said base, said sectors having holes coinciding with said base holes and threaded adjacent said base and being of smaller diameter than said base holes, screws passing through said holes in said base and threaded into said sector holes thereby interlocking said sectors with said base while permitting radial movement of said sectors with respect to said base, a pilot threaded at one end into said threaded bore in said base and having a taper interacting with the taper of said cylinder bore, said pilot being adapted at its opposite end to receive and center a valve seat grinder.

2. Apparatus for centering a valve seat grinder with respect to a valve port comprising: a cylindrical base provided with an axial, threaded bore, said base having a plurality of grooves on the circumference thereof directed axially and spaced radially and equiangularly from said threaded bore, a plurality of sectors engaging said base, said sectors forming substantially a cylinder, adapted to expand into engagement with the walls of a valve port, said cylinder being provided with an axial bore in alignment with said base bore, said cylinder bore being tapered, with the taper narrowing toward said base, a T-shaped securing member depending from each of said sectors, the legs of the T's passing through said grooves in said base and the arms of the T's extending adjacent the bottom face of said base thereby interlocking said sectors with said base while permitting radial movement of said sectors with respect to said base, a split ring resiliently uniting said sectors together, a pilot threaded at one end into said base bore and having a taper interacting with the taper of said cylinder bore, said pilot being adapted at its opposite end to receive and center a valve seat grinder.

3. Apparatus for centering a valve seat grinder with respect to a valve port comprising: a cylindrical base provided with an axial, threaded bore, said base having a plurality of passageways therein directed axially and spaced radially and equiangularly from said threaded bore, a plurality of sectors engaging said base, said sectors forming substantially a cylinder, adapted to expand into engagement with the walls of a valve port, said cylinder being provided with an axial bore in alignment with said base bore, said cylinder bore being tapered, with the taper narrowing toward said base, a securing member depending from each of said sectors and passing through said passageways in said base thereby interlocking said sectors with said base while permitting radial movement of said sectors with respect to said base, a pilot threaded at one end into said base bore and having a taper interacting with the taper of said cylinder bore, said pilot being adapted at its opposite end to receive and center a valve seat grinder.

LYSLE W. STANFIELD.

REFERENCES CITED

The following references are of record in the file of this patent:

UNITED STATES PATENTS

| Number | Name | Date |
|---|---|---|
| 1,616,498 | Howser | Feb. 8, 1927 |
| 1,744,878 | Gabel | Jan. 28, 1930 |
| 1,775,898 | Fleming | Sept. 16, 1930 |
| 1,822,649 | Evans | Sept. 8, 1931 |

FOREIGN PATENTS

| Number | Country | Date |
|---|---|---|
| 574,041 | Great Britain | Dec. 18, 1945 |